(12) United States Patent
Ohishi et al.

(10) Patent No.: US 6,356,344 B1
(45) Date of Patent: Mar. 12, 2002

(54) MIXING APPARATUS AND OPTICAL RANGEFINDER USING THE SAME

(75) Inventors: Masahiro Ohishi; Fumio Ohtomo, both of Tokyo (JP)

(73) Assignee: Kabushiki Kaisha Topcon (JP)

( * ) Notice: Subject to any disclaimer, the term of this patent is extended or adjusted under 35 U.S.C. 154(b) by 0 days.

(21) Appl. No.: 09/450,254

(22) Filed: Nov. 29, 1999

(30) Foreign Application Priority Data

Nov. 27, 1998 (JP) .......................................... 10-353989

(51) Int. Cl.[7] .............................. G01C 3/08; H01S 3/00; G02B 26/00
(52) U.S. Cl. .......................... 356/5.1; 250/526; 372/33; 356/5.01; 356/5.14; 359/237
(58) Field of Search ............................. 356/5.01–5.15; 250/526; 372/33; 359/237

(56) References Cited

U.S. PATENT DOCUMENTS 3,900,259 A * 8/1975 Mott et al.
4,553,836 A * 11/1985 Meier et al.
4,856,899 A * 8/1989 Iwaoka et al.
5,430,537 A * 7/1995 Liessner et al. ............. 356/5.1

FOREIGN PATENT DOCUMENTS

JP    63-216003    9/1988

* cited by examiner

*Primary Examiner*—Stephen C. Buczinski
(74) *Attorney, Agent, or Firm*—Baker Botts LLP

(57) ABSTRACT

The invention particularly relates to a mixing apparatus using an eccentric phase plate, and an optical rangefinder using the mixing apparatus. In the optical rangefinder, an external distance measurement optical path leads light from the light source to a light receiving part passing through an article to be measured, an internal distance measurement optical path leads the light from the light source to the light receiving part not passing through the article to be measured, and processing means calculates the distance to the article to be measured from the difference between the distance value obtained by the external distance measurement optical path and the distance value obtained by the internal distance measurement optical path. In the mixing apparatus, driving means drives the phase plate.

15 Claims, 12 Drawing Sheets

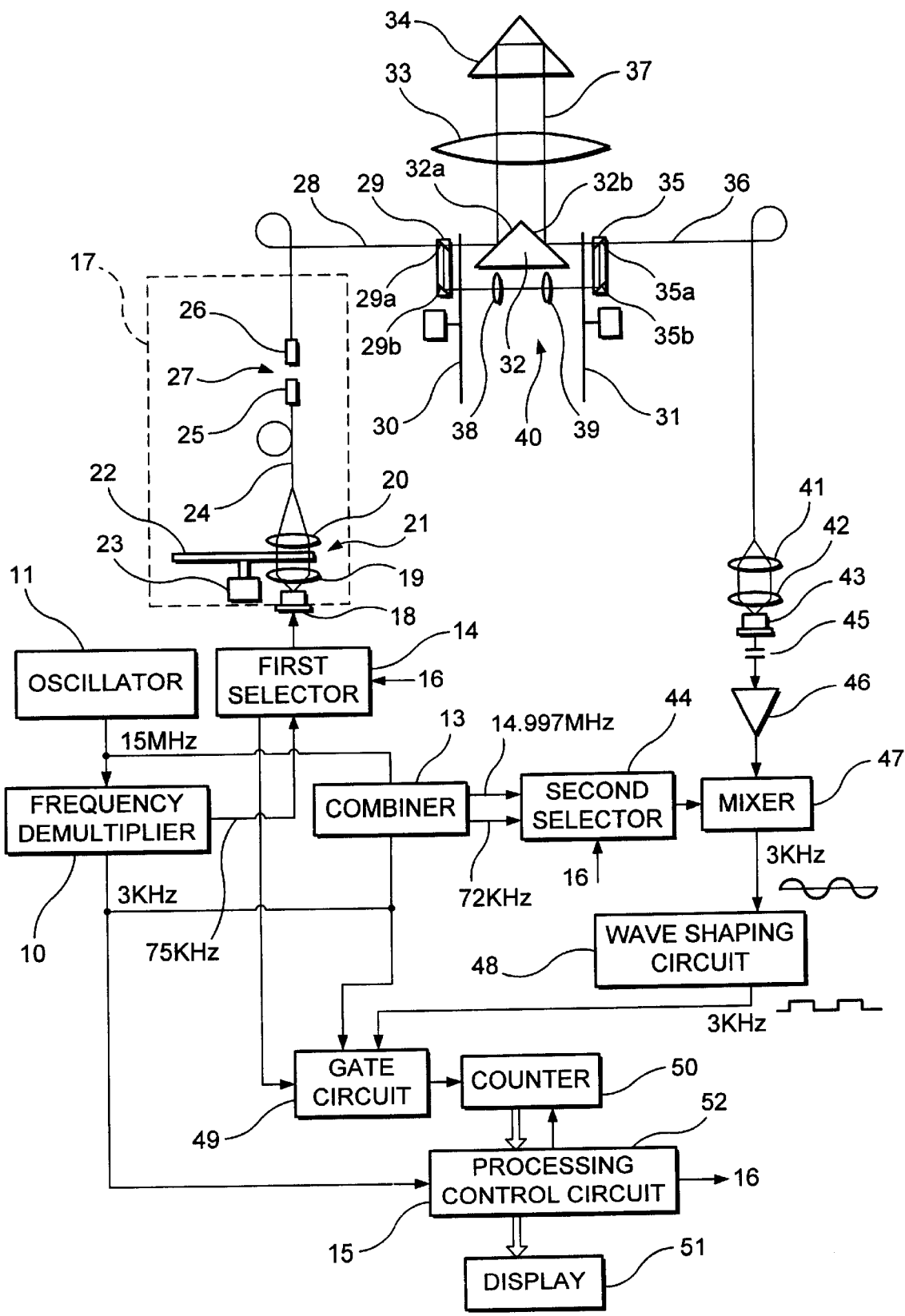
F I G. 1

$\theta = \frac{\lambda}{d}$    $M = (n_1 - n_0)\frac{2\pi}{\lambda}$

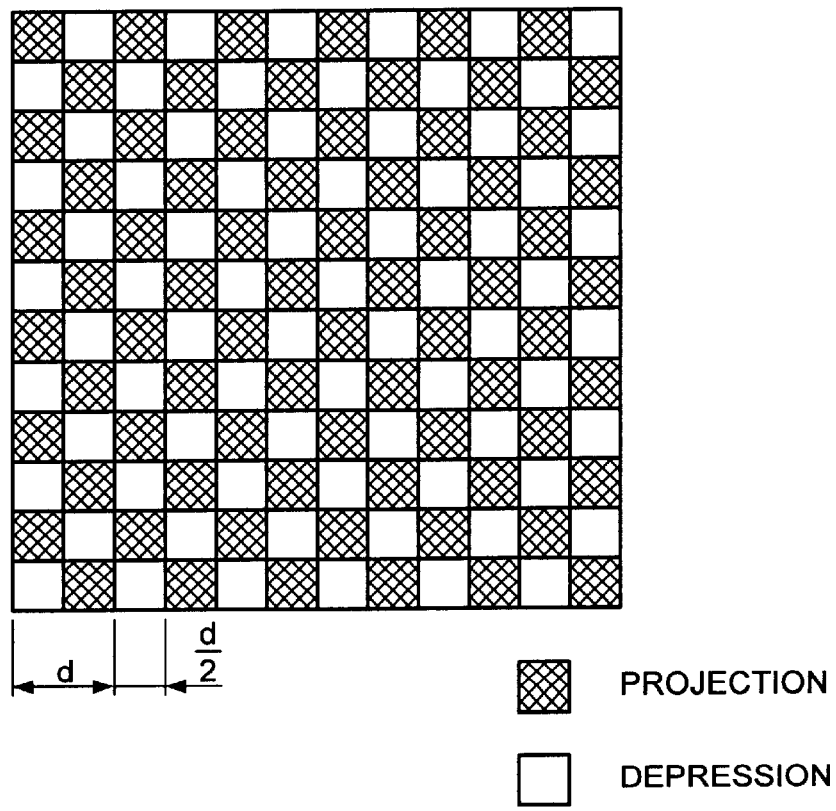
F I G. 6
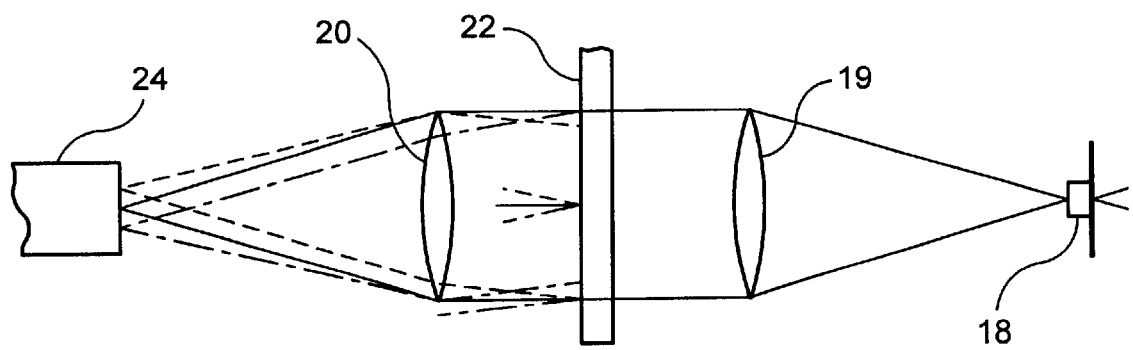
F I G. 7

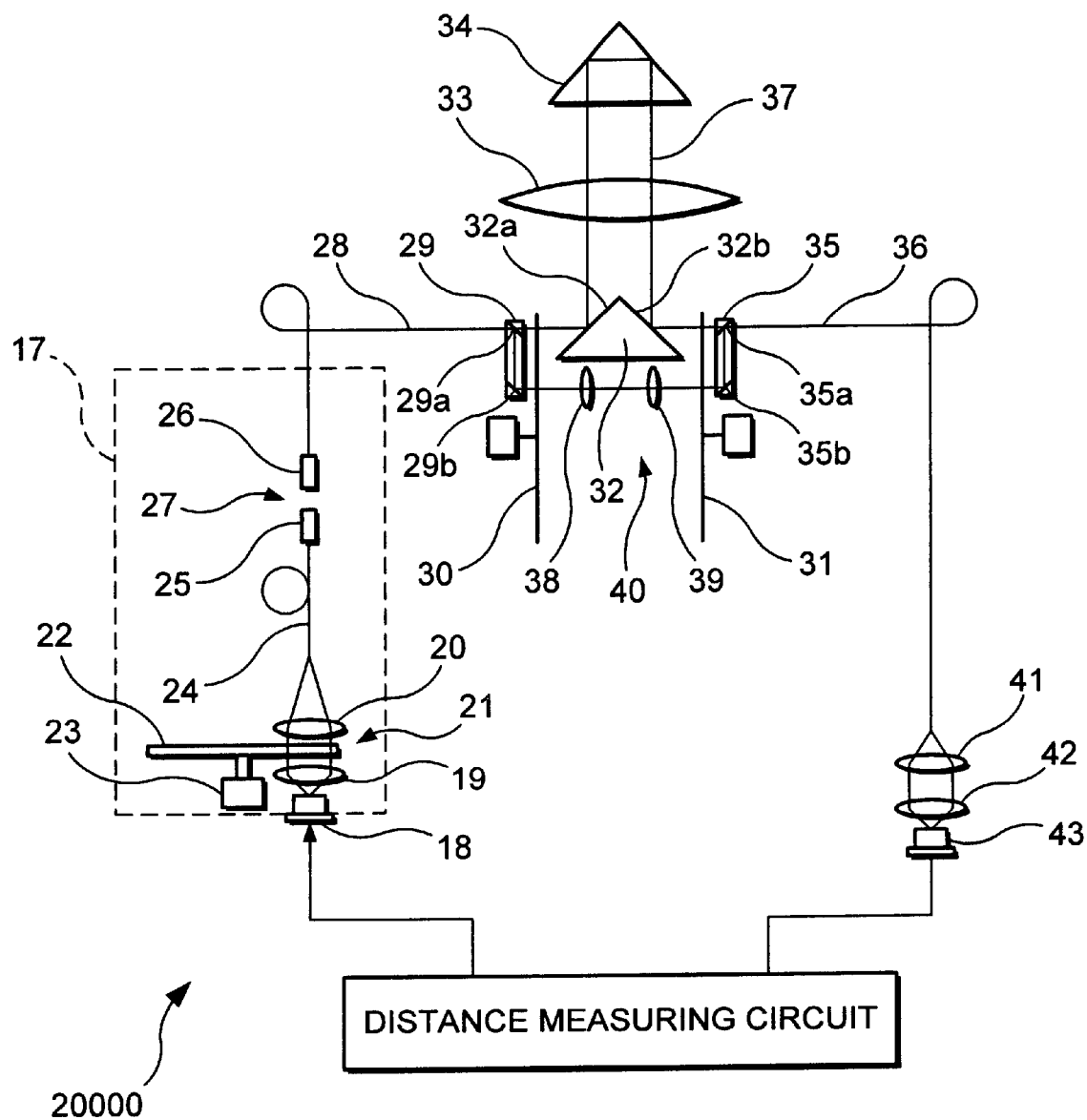
F I G. 10

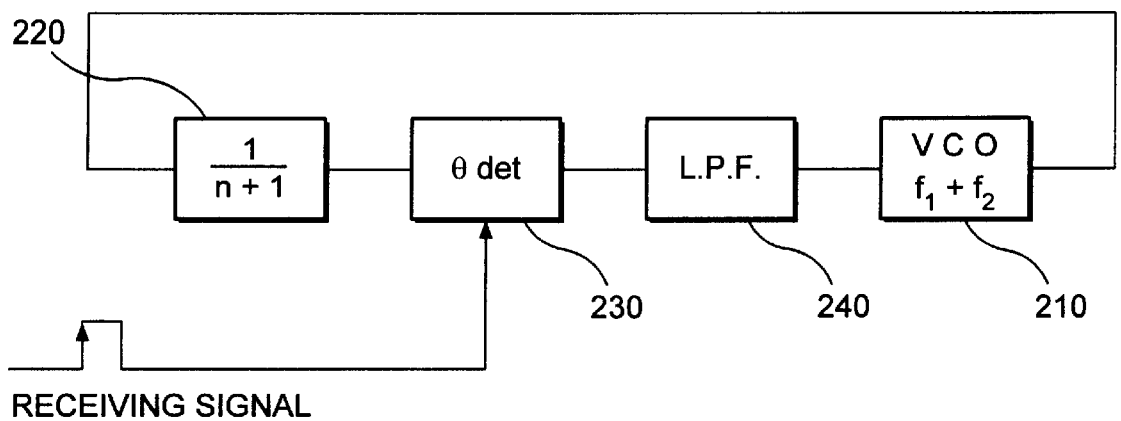
F I G. 13
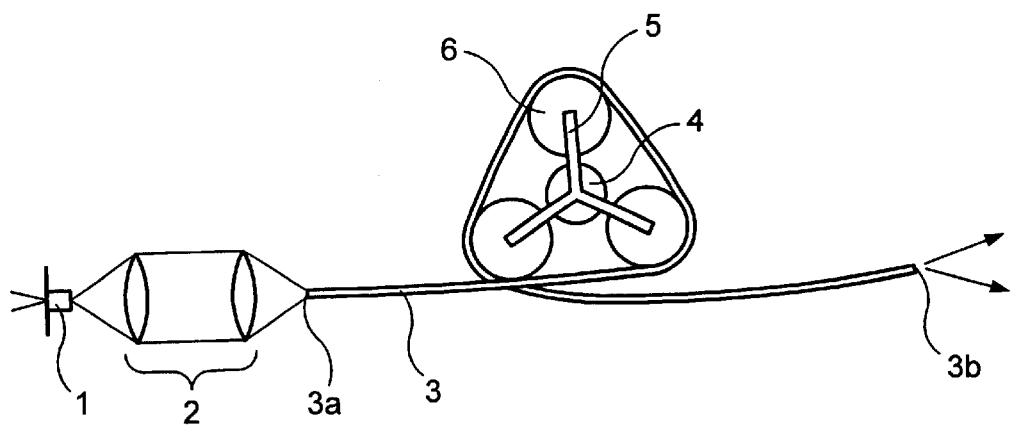
F I G. 16

MIXING APPARATUS AND OPTICAL RANGEFINDER USING THE SAME

BACKGROUND OF THE INVENTION

The present invention relates to a mixing apparatus to be used for a laser light source and an optical rangefinder using the same, and more particularly to a mixing apparatus using a phase plate in eccentricity and an optical rangefinder using the same.

In the prior art, there is an optical rangefinder or the like using a laser diode in a light source, whereby measurement with high accuracy becomes possible. The laser diode used in the light source has problems in that when laser rays are emitted, waveform irregularity is not inevitable and the waveform is different depending on angle of emission.

In view of such problems, mixing apparatuses to eliminate the waveform irregularity in the laser light source have been developed. Such a mixing apparatus is disclosed, for example, in Japanese Patent Laid-open No. Sho 63-216003. Here, referring to FIG. 16, the mixing apparatus disclosed in Japanese Patent Laid-open No. Sho 63-216003 will be described.

In the prior art mixing apparatus, light emitted from a semiconductor laser (1) is coupled with an optical fiber (3) of step index type by a condenser lens (2). The optical fiber (3) is wound around an optical fiber vibration device constituted by a motor (4), an arm (5) and a roller (6). The light passing through the optical fiber is emitted from an emission end (3b). When the motor (4) is rotated, the abutment position between the roller (6) and the optical fiber (3) is varied and vibration is produced in the optical fiber (3).

Since the strain position of the optical fiber (3) is varied by the vibration and the total internal state within the optical fiber (3) is varied, the light waveform irregularity is mixed at the emission end (3b).

In the mixing apparatus disclosed in Japanese Patent Laid-open No. Sho 63-216003, however, since the abutment position of the roller (6) is varied due to the rotation of the motor (4), the optical fiber (3) is always bent and stretched repeatedly, whereby a problem exists in that there is apprehension about the durability of the optical fiber (3).

Further since the motor (4) driving the roller (6) is always subjected to the torque due to the bending and stretching of the optical fiber (3), a problem exists in that the consumption power of the motor (4) becomes large.

Also since the vibration produced from the mixing apparatus can not be ignored, when the mixing apparatus is applied to the optical rangefinder, the conclusive vibration measure is necessary and the cost becomes high.

SUMMARY OF THE INVENTION

In the present invention, the external distance measurement optical path leads the light from the light source part passing through an article to be measured to the light receiving part, and the internal distance measurement optical path leads the light source part not passing through an article to be measured to the light receiving part, and processing means calculates the distance to the article to be measured from the difference between the distance value obtained by the external distance measurement optical path and the distance value obtained by the internal distance measurement optical path, and the mixing apparatus has the drive means for driving the phase plate.

BRIEF DESCRIPTION OF THE DRAWINGS

Drawings show embodiments of the present invention, in which:

FIG. 1 is a diagram explaining constitution of an optical rangefinder 10000 being a first embodiment of the present invention;

FIG. 6 is a diagram showing a phase plate 22;

FIG. 7 is a diagram explaining phase modulation grating;

FIG. 10 is a diagram explaining constitution of an optical rangefinder 20000 in a second embodiment;

FIG. 13 is a diagram explaining a phase detector;

FIG. 16 is a diagram explaining the prior art.

DESCRIPTION OF PREFERRED EMBODIMENTS OF THE INVENTION

Figure 2:
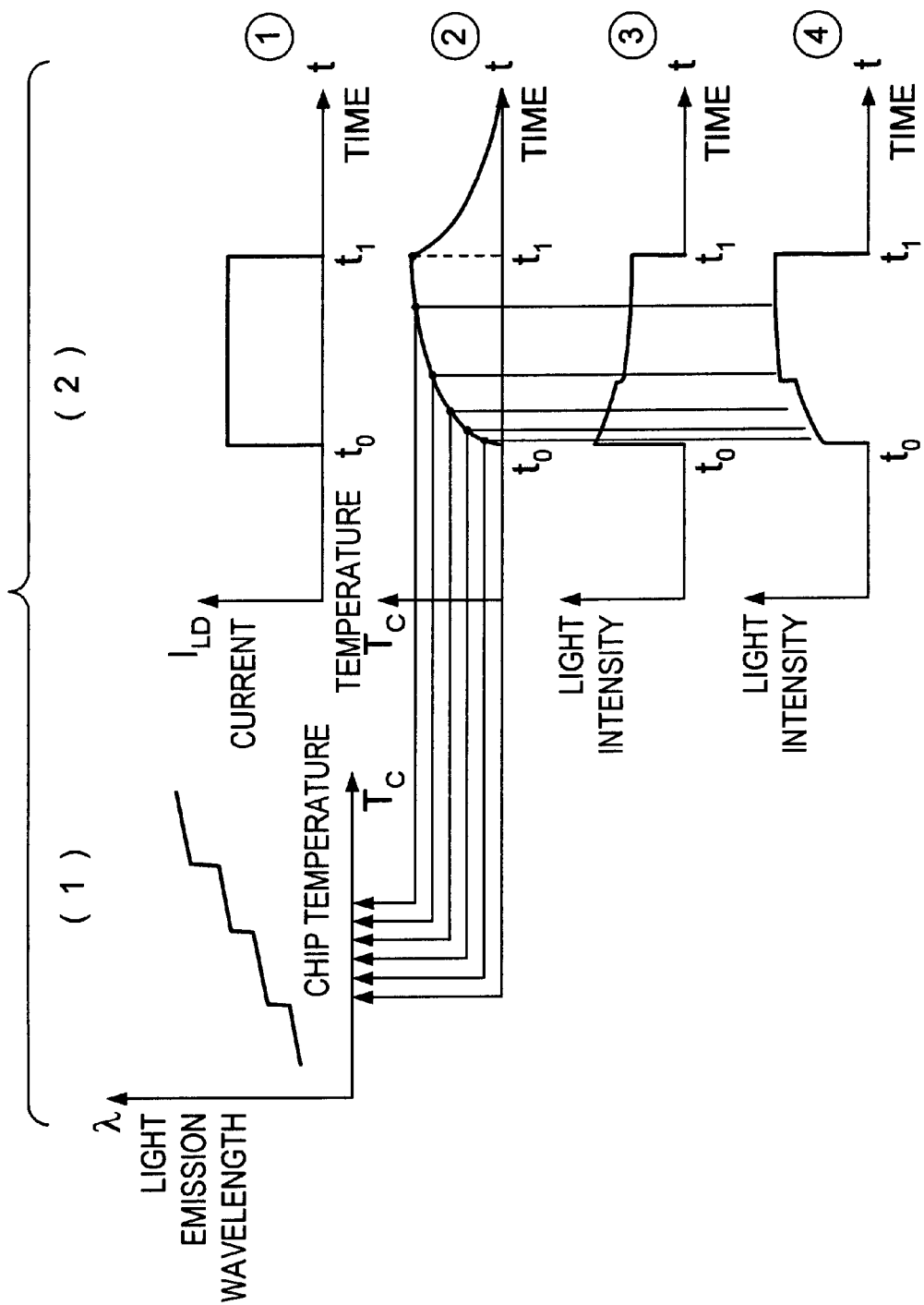
FIG. 2 is a diagram explaining operation of a semiconductor laser 18.

Embodiments of the present invention will be described based on the accompanying drawings.

First Embodiment

An optical rangefinder 10000 utilizing a modulation light being a first embodiment of the present invention will be described based on FIG. 1.

A frequency demultiplier 10 of the optical rangefinder 10000 demultiplies the frequency of a signal of 15 MHz from an oscillator 11, and generates two signals of 75 KHz and 3 KHz. A combiner 13 generates a signal of 14.997 MHz being difference between a signal of 15 MHz from the oscillator 11 and a signal of 3 KHz from the frequency demultiplier 10, and a signal of 72 KHz being 24 times of the signal of 3 KHz from the frequency demultiplier 10.

A first selector 14 generates a signal of either 15 MHz or 75 KHz by a signal 16 from a processing control circuit 15. In addition, the processing control circuit 15 corresponds to the processing means.

A semiconductor laser 18 arranged within a mixing apparatus 17 is driven by an output signal of the first selector 14 and emits a modulated light. The emitted light is incident to an optical fiber 24 by an optical expander 21 constituted by lenses 19 and 20. In addition, the semiconductor laser 18 corresponds to the light source part.

A phase plate 22 of disk type as described later is inserted between the two lenses 19 and 20, and is rotated by a motor 23. A light emitted from the optical fiber 24 is subjected to phase angle conversion by a light phase angle converter 27 constituted by SELFOC lenses 25 and 26 and then incident to a second optical fiber 28.

A light emitted from the second optical fiber 28 is divided into two optical paths by a dividing prism 29. That is, light in one optical path is transferred through a dividing part 29a of the dividing prism 29 and is transmitted through a chopper 30 and is reflected by a reflection surface 32a of a prism 32 and is made parallel luminous flux by an objective lens 33 and is radiated out of the apparatus. The light is reflected by a corner-cube prism 34 disposed at the position to be measured and passes through the objective lens 33 again and is reflected by a reflection surface 32b of the prism 32 and passes through a density filter 31. Subsequently the light passes through a dividing part 35a of a dividing prism 35, and then is incident to an optical fiber 36 at the reception side. Thus, the light in one optical path, described above, forms an external distance measurement optical path 37.

A light in the other optical path is reflected by dividing parts 29a and 29b of the dividing prism 29 and passes through the chopper 30 and is made parallel luminous flux by a lens 38 and is converged by a lens 39 and passes through the density filter 31. Subsequently the light is reflected by dividing parts 35a and 35b of the dividing prism 35 and then is incident to an optical fiber 36 at the reception side. Thus, the light in the other optical path, described above, forms an internal reference optical path 40.

The chopper 30 selects the internal reference optical path 40 and the external distance measurement optical path 37 alternately, and the density filter 31 adjusts the level of the light quantity in the internal reference optical path 40 and the external distance measurement optical path 37. The light incident to the optical fiber 36 at the reception side passes through the lenses 41 and 42 and is received by the light receiving element 43. In this case, the light receiving element 43 corresponds to the light receiving part.

The internal reference optical path 40 prevents the state that error is produced in the measurement data due to the phase variation caused by the temperature drift or the like in the electric circuit constituting the optical rangefinder, and the measurement value by the internal reference optical path 40 is subtracted from the measurement value by the external distance measurement optical path 37, whereby the accurate data can be obtained.

A second selector 44 outputs either a signal of 14.997 MHz or a signal of 72 KHz by the signal 16 from the processing control circuit 15. Output from the light receiving element 43 passes through a capacitor 45, is amplified by an amplifier 46 and is inputted to a mixer 47. The mixer 47 mixes the signal from the amplifier 46 and the signal from the second selector 44, whereby a beat signal is formed and detected and sinusoidal wave of 3 KHz is outputted. A wave shaping circuit 48 shapes the sinusoidal wave of 3 KHz into square wave and outputs the shaped signal (hereinafter referred to as "beat down signal").

The gate circuit 49 inputs the signal of 3 KHz from the frequency demultiplier 10 as a start signal and the signal from the wave shaping circuit 48 as a stop signal, and between the start signal and the stop signal, the signal of 15 MHz from the oscillator 11 is outputted to the counter 50 such that the signal is counted, whereby the phase difference is measured. The count value obtained in the counter 50 is the sum total in the measurement of N times. In order to know the number of N times, the signal of 3 KHz from the frequency demultiplier 10 is supplied to the processing control circuit 15. Upon finishing the counting of N times, a reset signal 52 from the processing control circuit 15 is supplied to the counter 50 which becomes reset state. The count value is averaged in the processing in the processing control circuit 15. The averaged value (1/N of the count value) is converted into the distance value and then outputted as the distance measurement value to a display 51.

In order that the output of the mixer 47 is made 3 XHz, the output signal of the first selector 14 and the output signal of the second selector 44 are controlled by the signal 16 from the processing control circuit 15 so that when the former is 15 MHz, the latter becomes 14.997 MHz, or when the former is 75 KHz, the latter becomes 72 KHz.

The semiconductor laser 18 is modulated by two kinds of frequencies, 15 MHz and 75 KHz, so that the frequency 15 MHz corresponding to the wavelength 20 m is used for the fine measurement and the frequency 75 KHz corresponding to the wavelength 4,000 m is used for the coarse measurement. Also the frequencies of 15 MHz and 75 KHz are made the frequency of 3 KHz respectively by the mixer 47 so that the phase in 15 MHz or 75 KHz is measured as the phase in 3 KHz whereby the resolution of the phase measurement is raised.

Here the mixing apparatus 17 of the present invention will be described.

At first, the cause of the waveform irregularity in the light emission of the semiconductor laser 18 and the principle of the mixing apparatus 17 will be described.

In general, regarding the cause of the waveform irregularity of the light emission of the semiconductor laser 18, two factors are pointed out. One is that depending on difference of response due to the irradiation angle of light, and another is that depending on variation with lapse of time of the speckle pattern.

At first, the variation with lapse of time of the speckle pattern will be described. Regarding the semiconductor laser 18, it is generally known that the wavelength of the light emission is varied with temperature, and the state will be shown in FIG. 2(1). That is, the light emission wavelength λ of the semiconductor laser 18 becomes large with the rise of the chip temperature Te, and is varied continuously to the chip temperature Te. This is because the light emission wavelength λ of the semiconductor laser 18 is determined by following equation.

$$1 \cdot n = (\lambda/2) * q \tag{1}$$

where 1: resonator length of laser chip
n: refractive index of active layer
λ: wavelength
q: integer Therefore if the refractive index n of the active layer is varied with temperature, the wavelength is varied attendant on this. Also in the case that the variation of the refractive index of the active layer with the temperature variation is made Δn, when Δn·1 being the variation of the optical length of the active layer is less than ½ of the resonance wavelength of the semiconductor laser 18, the resonance wavelength is varied continuously. On the other hand, when Δn·1 is larger than ½ of the resonance wavelength of the semiconductor laser 18, the discontinuity phenomenon of the wavelength variation called mode jump occurs.

The mode jump is the phenomenon that when the resonator length of the semiconductor laser 18 is varied to the half wavelength or more in the standing wave (longitudinal mode) of the light in the longitudinal direction of the resonator, the oscillation mode is jumped to the longitudinal mode being different from the mode until then.

Now based on FIG. 2(2), the state will be described when the modulation current in square wave flows in the semiconductor laser 18.

Figure 3:
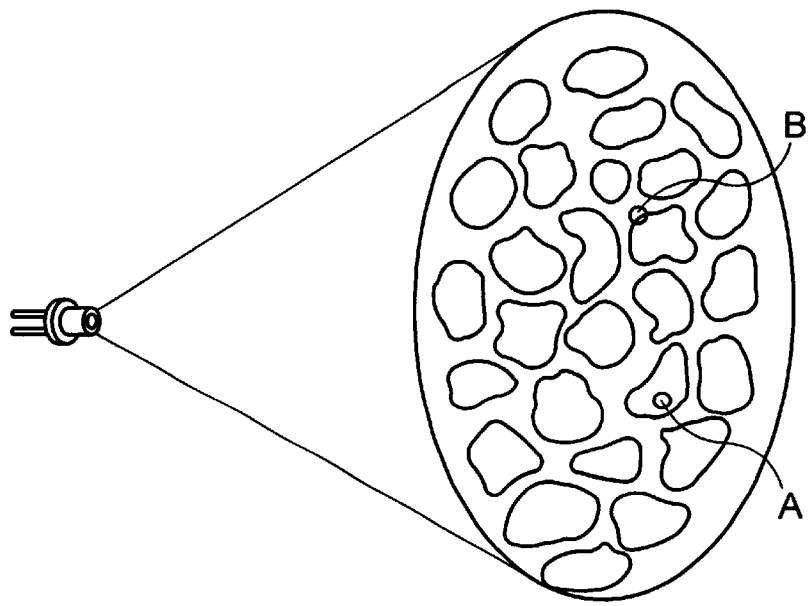
FIG. 3 is a diagram explaining speckle pattern of the semiconductor laser 18.

Assume that a current in square wave as shown in FIG. 2(2)① flows in the semiconductor laser 18 from the time $t_0$ to the time $t_1$. The semiconductor laser 18 produces the speckle pattern as shown in FIG. 3 due to the coherence. On the other hand, the chip of the semiconductor laser 18 is heated because of the flow of the drive current, and the temperature rises to the temperature that the heat generation amount of the chip and the heat radiation amount to the copper base on which the semiconductor laser is mounted or to the air are balanced with each other. FIG. 2(2)② shows the temperature rise of such a chip.

If the temperature of the semiconductor laser 18 rises, the light emission wavelength λ will be varied due to the above-mentioned cause, and if the light emission wavelength λ is varied, the speckle pattern in FIG. 3 produced as the interference pattern is varied attendant on the variation of the light emission wavelength λ. The light intensity waveform of the individual points, the A point and the B point, in FIG. 3 is shown in FIG. 2, ③ and ④ respectively. That is, at the A point in FIG. 3, the light in the speckle pattern is strong at the time $t_0$, and the light becomes weak gradually depending on the variation of the light emission wavelength λ (FIG. 2③). On the other hand, at the B point in FIG. 3, the light in the speckle pattern is weak at the time $t_0$, and the light becomes strong gradually depending on the variation of the light emission wavelength λ (FIG. 2④).

As a result, comparing the wavelength at the A point with the waveform at the B point, the phase of the fundamental wave component of the waveform is shifted, and it is seen that the former is advanced from the latter in the phase. Thus if the semiconductor laser 18 is modulated, irregularity in the light emission waveform is produced due to the coherence and the dependence of the waveform on the temperature.

Another irregularity of the light emission waveform being that due to the difference of the response by the light emission angle seems simple response irregularity being not relevant to the coherence of light.

Next, the mixing apparatus 17 will be described.

The mixing apparatus 17 is constituted by two mixing apparatuses. One is a phase plate 22, and the other is a phase angle converter 27. The phase angle converter 27 mixes waveform irregularity caused by the difference of response due to emitting angle of the semiconductor laser 18. The principle and action of the phase angle converter 27 are described in Japanese Patent Laid-open No. Sho 63-216003.

Next, the principle of the phase plate 22 will be described.

Figure 4:
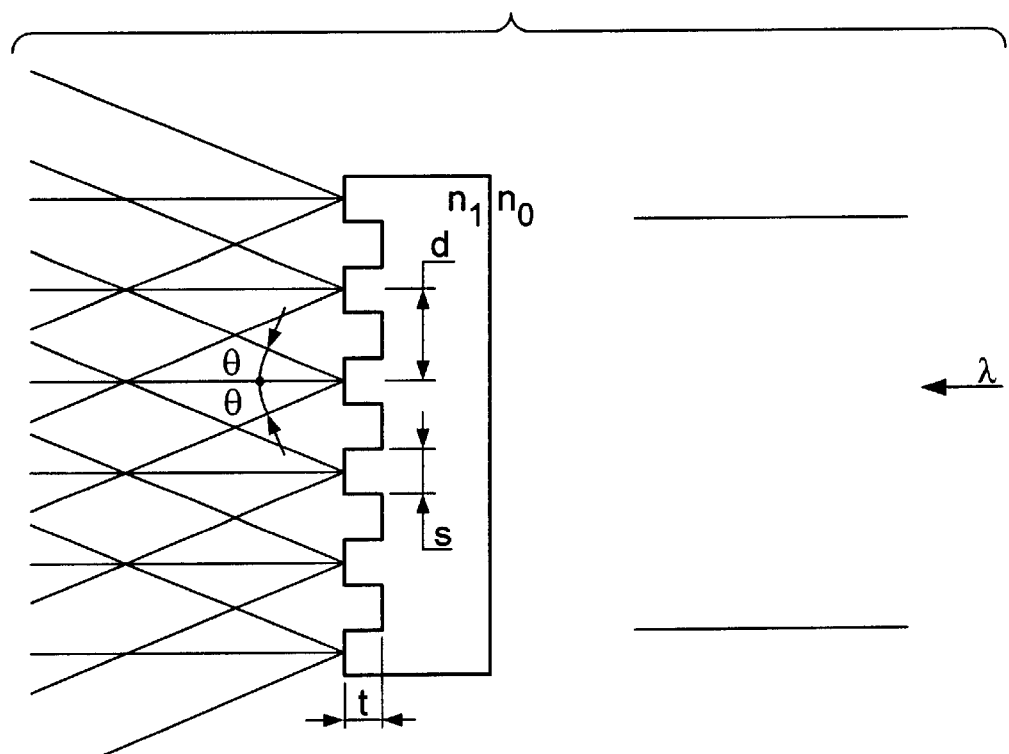
FIG. 4 is a diagram explaining phase modulation grating.

At first, referring to FIG. 4, an example of a general phase modulation grating will be described.

The phase modulation grating is constituted by a parallel flat glass plate on which projections and depressions with depth t are provided in spacing of pitch d. If the light of wavelength λ is incident to the phase modulation grating, diffraction is produced.

Figure 5:
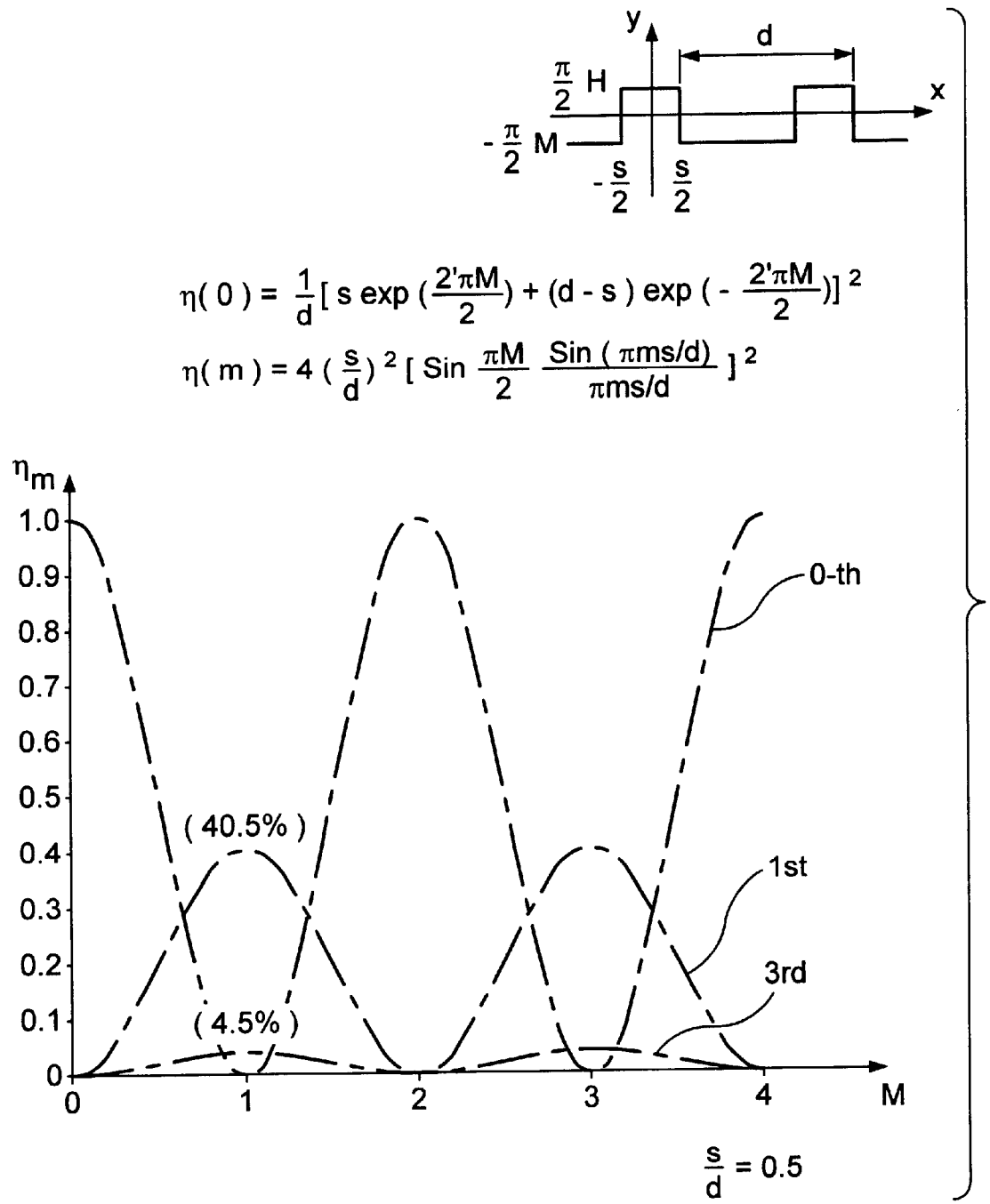
FIG. 5 is a diagram explaining phase modulation grating.

Then the diffraction angle of m-th order $\theta_m$ and the intensity of the diffraction angle of m-th order $\eta_m$ are expressed by following equations respectively.

$$\theta_m = m*(\lambda/d) \quad (2)$$

$$\eta_m = 4*(S/d)^2 (\sin(\pi* M)*\sin(\pi*m*S/d)/(\pi*m* S/d))^2 \text{ where } M = t*(n_1-n_0)*(2*\lambda) \quad (3)$$

where S: width of projection $n_1$: refractive index of grating $n_0$: refractive index of air FIG. 5 shows relation of M and $\eta_m$ when S/d=0.5. When M=1 (difference of the optical path length of the light passing through the depression and the projection is λ/2), the diffraction light is strongest, and the lights of (+1)th order and (−1)th order become 81% of the whole light quantity.

Pattern shown in FIG. 6 will be thought of. In the phase plate 22, length of one side is d/2 and hatched portions and blanched portions are arranged in checkerwise pattern. Here, the hatched portion is a projection and the blanched potion is a depression, and the phase difference between the projection and the depression is π/2.

Figure 8:
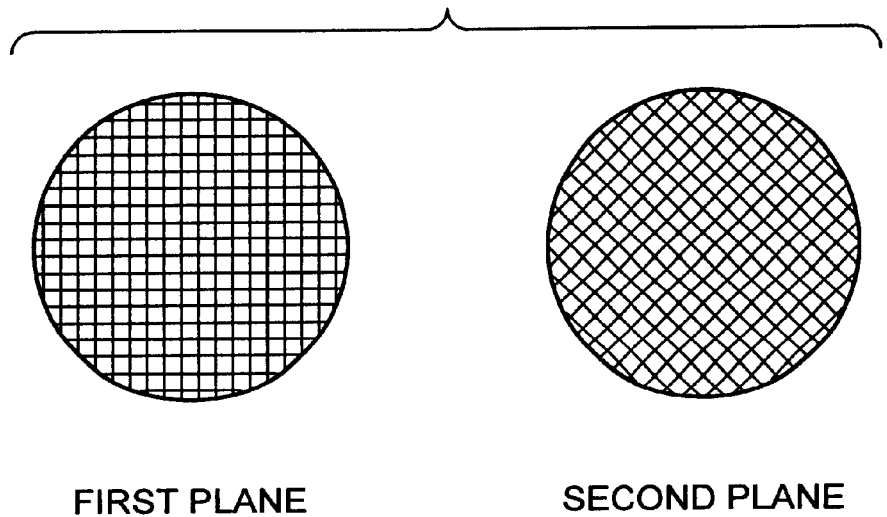
FIG. 8 is a diagram explaining the case that phase modulation grating is formed on a screen.

As shown in FIG. 8, this pattern may be provided on the first plane and the second plane of the flat glass plate in slanted form from each other by 45 degrees.

Next, operation when the phase plate 22 is inserted between the lenses 19 and 20 will be described based on FIG. 7.

The light emitted from the semiconductor laser 18 is made parallel luminous flux by the lens 19, and is diffracted by the phase plate 22. The light in 0-th order and the diffracted light are collected by the lens 20 and focused on the end surface of the optical fiber 24. The image on the end surface of the optical fiber 24 is the image formed in that the image by the diffracted light in 0-th order and the image by the diffracted light are superposed.

The phase plate 22 is rotated by the motor 23. Then the phase plate pattern on the parallel luminous flux between the lenses 19 and 20 is varied. Attendant on this, also the diffraction pattern of the light is varied and the image pattern focused on the end surface of the optical fiber 24 is varied with lapse of time. Since the image pattern is varied, the interference state of the light within the optical fiber 24 is varied and also the speckle pattern in the emitting end of the optical fiber 24 is varied with lapse of time.

So the waveform irregularity explained in FIGS. 2 and 3 is varied with lapse of time, and the waveform is averaged with time whereby the waveform irregularity can be removed. The pitch of the phase plate 22 is d and the diffraction angle in m-th order is expressed by $\theta_m = m*(\lambda/d)$.

As a result, the diffraction image in m-th order on the end surface of the optical fiber 24 is focused within a certain range. When the phase plate 22 is rotated, various image patterns are formed within a certain range and the efficient mixing can be performed.

Figure 9:
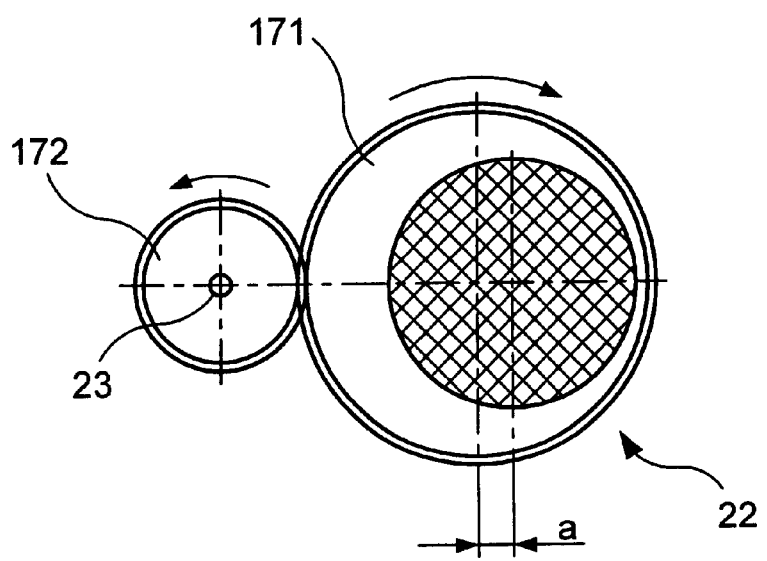
FIGS. 9 is a diagram explaining a mixing apparatus 17 in the embodiment.

As shown in FIG. 9, in the mixing apparatus 17 in this embodiment, the grating part of the phase plate 22 is eccentric. Consequently when the phase plate 22 is rotated in the state that the center of the diffraction grating is shifted from the rotation center, the mixing efficiency can be raised.

In this embodiment, the driving is performed indirectly through a driven gear 171. Consequently a driving gear 172 is mounted on a motor 23 and the rotation driving force is transmitted to the phase plate 22. In addition, the motor 23 and the driving gear 172 corresponds to the driving means.

When the phase plate 22 is rotated simply, since the pattern of the diffraction grating is rotated in the point symmetry with respect to the luminous flux from the light source, the mixing effect is low. However, the ideal mixing becomes possible by rotating the phase plate 22 with eccentricity.

Second Embodiment

An optical rangefinder 20000 utilizing a pulse light being a second embodiment of the present invention will be described based on FIG. 10.

Figure 11:
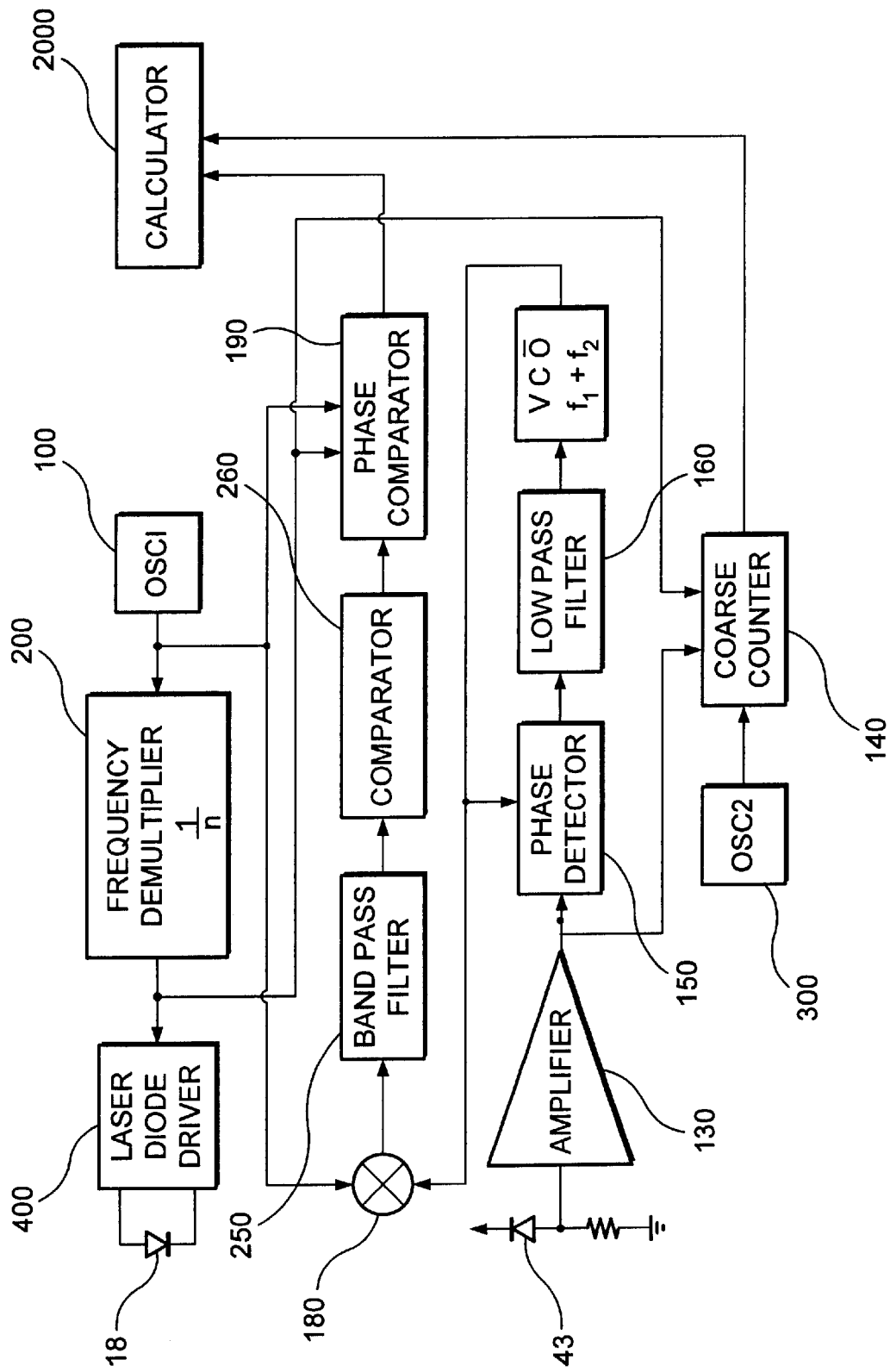
FIG. 11 is a diagram explaining electric constitution of the optical rangefinder 20000 in the second embodiment.

FIG. 11 shows constitution of an embodiment where the present invention is applied to the optical rangefinder 20000. The optical rangefinder 20000 comprises a first crystal oscillator 100, a frequency demultiplier 200, a second crystal oscillator 300, an optical system (50–120), a coarse counter 140, a phase detector 150, a low pass filter 160, a voltage control oscillator 170, a mixer 180, a band pass filter 250, a comparator 260, a phase comparator 190, a calculator 2000 and the like.

The phase detector 150, the low pass filter 160 and the voltage control oscillator 170 constitute a feedback loop. The mixer 180 mixes and detects an output signal of the voltage control oscillator 170 and an output signal of the first crystal oscillator 100, and takes out the difference frequency. The phase comparator 190 compares phase of an output signal of the mixer 180 and an output signal of the frequency demultiplier 200. The band pass filter 250 and the comparator 260 make the phase comparison easy. Also the second crystal oscillator 300 and the coarse counter 140 constitute coarse counter means for the coarse measurement.

Next, an optical path of the optical rangefinder 20000 will be described. The optical system is constituted by a laser diode 18, an optical fiber 24, a chopper 30, a distance measurement optical path 37, an internal optical path 40, an objective lens 33, a reception side fiber 36, a light receiving element 42 and a corner-cube prism 34.

The corner-cube prism 34 is a target disposed at a position remote from the main body of the optical rangefinder and has function of reflecting rays.

The laser diode 18 is a pulse laser diode and has relatively large peak power. The laser diode 18 can generate a pulse wave with the duty ratio of about 0.01%. The light receiving element 43 may be an element capable of receiving pulse rays emitted from the laser diode 18. The chopper 30 is a selector to select the distance measurement optical path 37 and the internal optical path 40.

In the optical system constituted as above described, the light pulse emitted from the laser diode 18 passes through the optical fiber 24 and is incident to the chopper 30. Then if the chopper 30 selects the distance measurement optical path 37, the light pulse passes through the objective lens 33 and is emitted from the main body. The emitted light pulse is reflected by the corner-cube prism 34 located as the target. The light pulse reflected by the corner-cube prism 34 passes through the objective lens 34 and the reception side fiber 36 and is incident to the light receiving element 43. These optical paths form the distance measurement optical path 37 including the distance between the main body and the target being an article, to be measured.

On the contrary, there is an optical path that the light pulse emitted from the laser diode 18 passes through the internal optical path 40 and the reception side fiber 36 and enters the light receiving element 43. This optical path is formed in order to remove the unstable factor produced within the main body.

In general, the optical range finder uses a number of electronic parts. Since the delay time of the electronic parts is liable to be affected by the temperature variation or the like, the unstable state may be produced within the main body. So the measurement is performed in the distance measurement optical path 37 and the internal optical path 40 and distance of the measured values is taken. As a result, the unstable factor within the main body of the optical rangefinder contained commonly in both optical paths can be removed.

Next, function of this embodiment will be described. The first crystal oscillator 100 oscillates in the frequency f1, and the output signal is sent to the frequency demultiplier 200. The frequency demultiplier 200 demultiplies the inputted frequency f1, and outputs the frequency of 1/n.

The output signal of the frequency demultiplier 200 is sent to the coarse counter 140 and becomes a start signal of the coarse counter 140. Further the output signal of the frequency demultiplier 200 is outputted to the laser diode driver 400 which makes the laser diode 18 emit light.

The light pulse emitted from the laser diode 18 passes through the optical system and is emitted from the main body of the optical rangefinder. The emitted light pulse is reflected at the corner-cube prism 34 as the target and is incident to the light receiving element 43 within the optical rangefinder. The incident light pulse is converted electrically at the light receiving element 43, and is further amplified at the amplifier 130. The output signal (received pulse) of the amplifier 130 becomes a stop signal of the coarse counter 140. A clock signal from the second crystal oscillator 300 is inputted to the coarse counter 140. The coarse counter 140 counts clocks from the start signal (output signal of the frequency demultiplier 200) to the stop signal (output signal of the amplifier 130), and transmits the data to the calculator 20000. The output signal (received pulse) of the amplifier 130 is sent also to the phase detector 150. The output of the phase detector 150 passes through the low pass filter 160 and is inputted to a frequency control terminal of the voltage control oscillator 170.

The phase detector 150, the low pass filter 160 and the voltage control oscillator 170 constitute a feedback loop, and the output signal of the amplifier 130 and the output signal of the voltage control oscillator 170 are synchronized. Here, the oscillation frequency f1+f2 of the voltage control oscillator 170 is selected so that $$f2=(1/n)*f1.$$

The output signal of the voltage control oscillator 170 is sent to the mixer 180 and is mixed and detected with the oscillation signal f1 of the first crystal oscillator 100 and is subjected to the waveform shaping by the band pass filter 250 and the comparator 260, and outputs the difference frequency f2.

The output signal of the comparator 260 is sent to the phase comparator 190, and the phase comparison with the output signal of the frequency demultiplier 200 is performed by the phase comparator 190.

Figure 12:
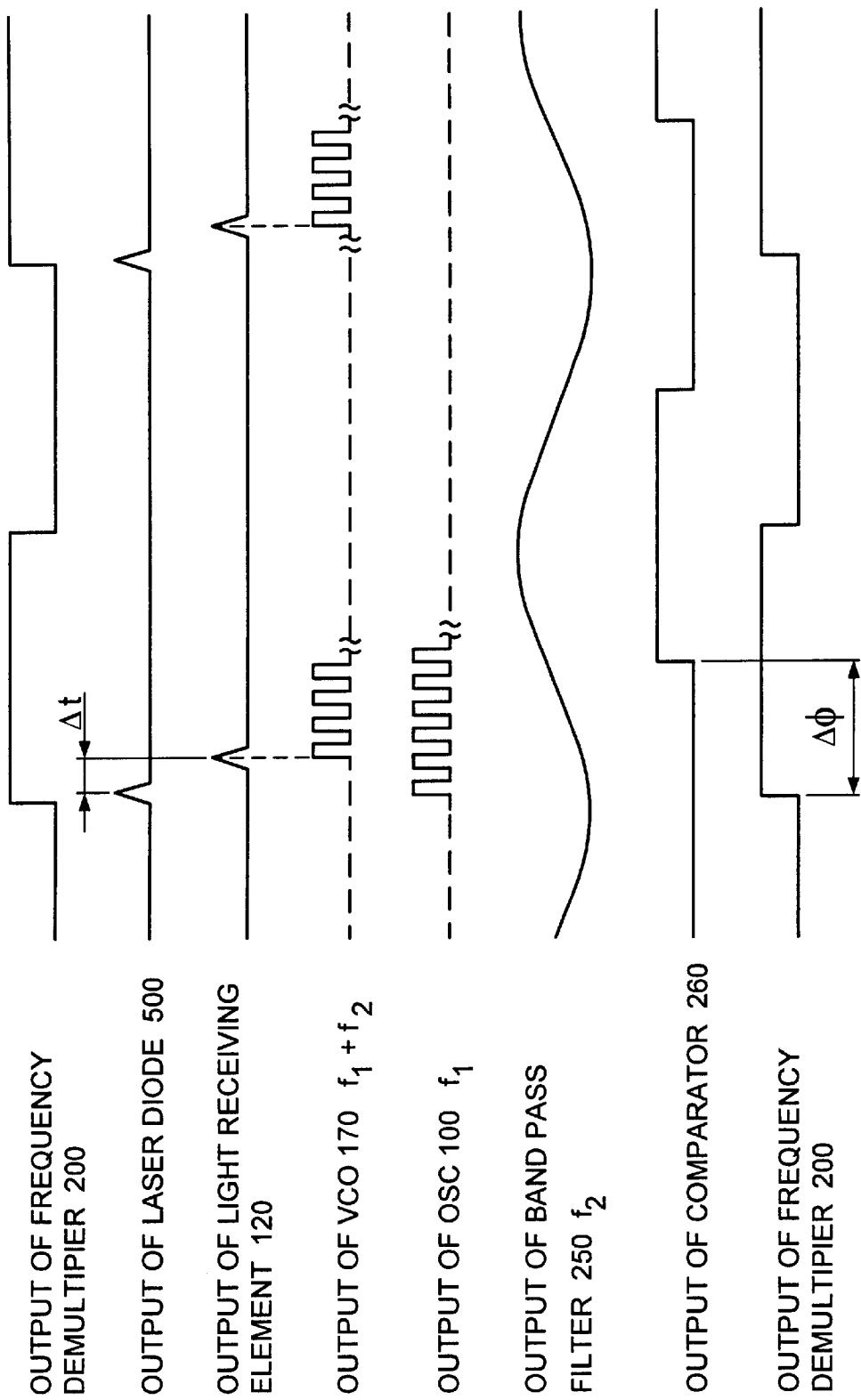
FIG. 12 is a diagram explaining phase relation of a received pulse and a voltage control oscillator.

Now relation between the transmission/reception pulses and the phase relation between the outputs of the comparator 260 and the frequency demultiplier 200 will be explained in FIG. 12. At first, assume that the distance measurement optical path 37 is selected by the chopper 30. If the time from the rise of the output of the frequency demultiplier 200 to the emission of the laser diode 18 and the reciprocation time of the light pulse being reflected by the corner-cube prism 34 and returned are made $\Delta t$, the received pulses appear in the output of the light receiving element 43 when the time $\Delta t$ elapses after the rise of the output of the frequency demultiplier 200.

The voltage control oscillator 170 is synchronized with the received pulse, and the phase relation of the output of the voltage control oscillator 170 to the output of the light receiving element 43 becomes as shown in FIG. 13. If $\Delta t$ is expressed by the output frequency (f1+f2) of the voltage control oscillator 170, it follows that $$\Delta t=k/(f1+f2)+(\Delta\phi/2\pi)*(1/(f1+f2))$$

where k is integer. Also $\Delta\phi$ is expressed by $$0\leq\Delta\phi<2\pi.$$

Where the fraction time less than one period of 1/(f1+f2) is expressed by the phase amount when 1/(f1+f2) is made one period.

The output of the voltage control oscillator 170 is mixed and detected with the frequency f1 of the first crystal oscillator 100 by the mixer 180 and passes through the band pass filter 250 and becomes frequency f2. Further the output is made square wave by the comparator 260 so that the phase comparison with the output of the frequency demultiplier 200 is readily performed. Here the phase difference between the output of the comparator 260 subjected to the phase comparison by the phase comparator 190 and the output of the frequency demultiplier 200 is equal to $\Delta\phi$ in the proceeding formula.

Consequently in order to measure $\Delta t$, k and $\Delta\phi$ in the proceeding formula may be detected.

For example, if f1 =15 MHz and n=5000, f2 becomes f2=15 MHz*(1/5000)=3 KHz.

The oscillation frequency (f1+f2) of the voltage control oscillator 170 becomes f1+f2=15.003 MHz Then it follows that $\Delta\phi$ is enlarged by (15.003 MHz/3 KHz)=5001 times The enlarged $\Delta\phi$ is made numeric word by the clock number of the first crystal oscillator 100 in the phase comparator 190, and is sent to the calculator 2000.

Also k is estimated as coarse measured value by the coarse counter 140 and is sent to the calculator 2000.

The calculator 2000 combines the coarse measured value by the coarse counter 140 and fine measured value obtained in the phase comparator 190, and calculates the delay time to be sought. Here the coarse counter 140 counts clock signals of the second crystal oscillator 300.

Consequently the count of the coarse counter 140 is not synchronized with the clock of the first crystal oscillator 100. So the light emission of the laser diode 18 and the received pulse, the start and stop signals are not synchronized with the second crystal oscillator 300. Consequently the quantization error produced by the clock of the second crystal oscillator 300 is reduced, and the measurement of plural times is averaged whereby the period longer than that of the second crystal oscillator 300 can be measured to a value of one clock or less.

On the contrary, the fine measurement can not measure the period longer than that of the first crystal oscillator 100. So the calculator 2000 compares the value of one clock or less in the coarse measurement with the most significant digit of the fine measured value, and adjusts the coarse measured value. The calculator 2000 then adds this value to the fine measured value thereby calculating the measured value to be sought.

The measurement in the distance measurement optical path 37 has been finished in the above-mentioned process. Next, if the internal optical path 40 is selected by the chopper 30, in similar manner to the case that the distance measurement optical path 37 is selected, the coarse measured value $k_i$ and the phase difference $\Delta\phi_i$ corresponding to the time $\alpha t_i$ from the rise of the output of the frequency demultiplier 200 to the received pulse being the output of the light receiving element 43 can be estimated.

Further from the coarse measured value k and the phase difference $\Delta\phi$ in the distance measurement optical path 37, the coarse measured value $k_i$ and the phase difference $\Delta\phi_i$ in the internal optical path 40 are substracted and the distance to the corner-cube prism can be estimated.

This embodiment as above described has an effect that the unstableness within the optical rangefinder due to the time from the rise of the output of the frequency demultiplier 200 to the light emission of the laser diode 18 or the drift of the electric circuit can be removed, and the distance can be measured accurately.

Next, an embodiment of the phase detection will be described based on FIG. 13. This embodiment is a general PLL (phase lock loop). The PLL comprises a voltage control oscillator 210, a frequency demultiplier 220, a phase comparator 230 and a low pass filter 240.

An output signal of the voltage control oscillator 210 is demultiplied into one by (n+1) by the frequency demultiplier 220, and the phase comparison with the received signal is performed in the phase comparator 230. The output signal of the phase comparator 230 passes through the low pass filter 240 and is outputted to a control terminal of the voltage control oscillator 210 and a feedback loop is formed. If this circuit is operated, the received signal and the output signal of the frequency demultiplier 220 are synchronized.

If the variable frequency range of the voltage control oscillator 210 is too wide, for example, when the output frequency of the mixer 180 is made 3 KHz, following two frequencies only remain 15 MHz−3 KHz=14.997 MHz 15 MHz+3 KHz=15.003 MHZ.

So it is necessary that the variable frequency range is limited to some degree and following condition is provided:

f<f2.

Figure 14A:
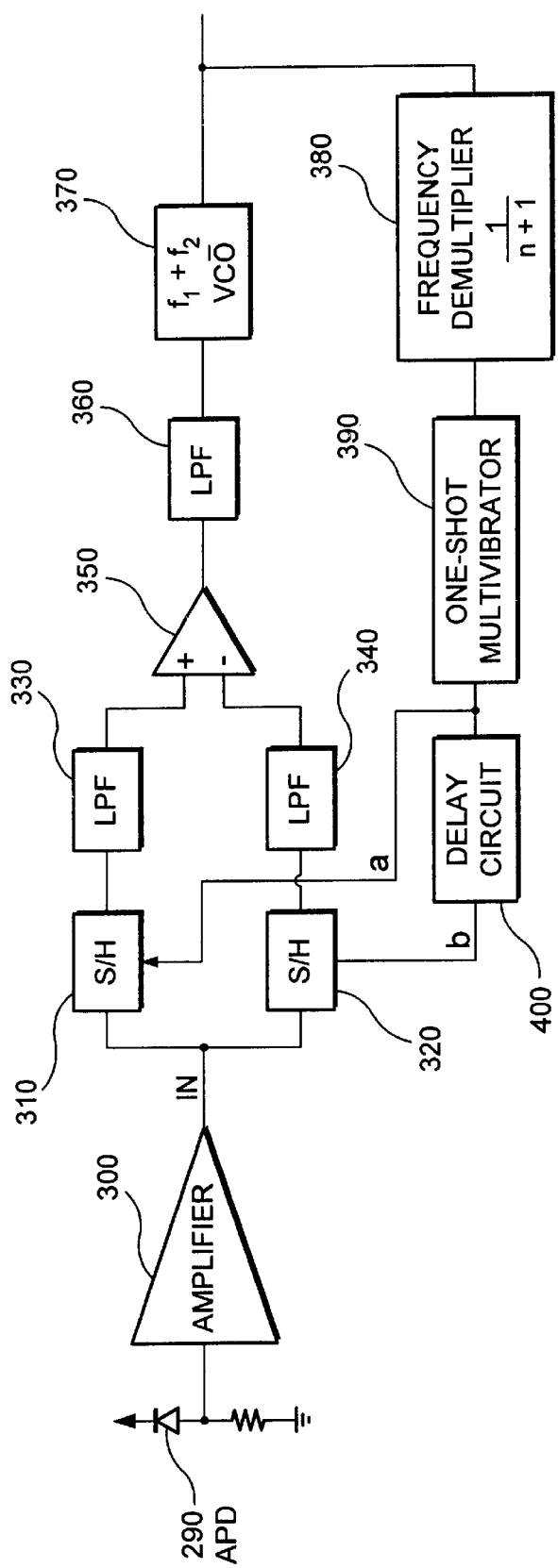
FIGS. 14(*a*) and 14(*b*) are diagrams explaining a modification.
Figure 14B:
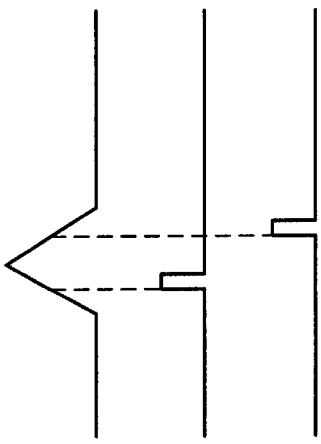

Another modification will be described referring to FIG. 14. In this embodiment, it is noticed that the light emission pulse of the laser diode 18 is substantially triangular wave, and the detection of the center position of the received signal is performed simultaneously. This embodiment, as shown in FIG. 14(a), comprises sample hold circuits 310 and 320, low pass filters 330, 340 and 360, a voltage control oscillator 370, a frequency demultiplier 380, a one-shot multivibrator 390, a delay circuit 400 and the like. A light pulse received by the light receiving element 43 is amplified in an amplifier 300 and outputted to the sample hold circuits 310 and 320. The sample hold circuits 310 and 320 perform the sample hold operation of the clock from the voltage control oscillator 370 at the timing of the frequency demultiplying by the frequency demultiplier 380.

Then the delay circuit 400 is inserted in the sample, hold circuit 320, and the sample hold circuit 320 performs the sample hold operation at the timing delayed from the sample hold circuit 310. The signal subjected to the sample hold operation passes through the low pass filters 330 and 340 and then is amplified in a differential amplifier 350. The sample hold signal passes through the low pass filter 360 and then is outputted to a control terminal of the voltage control oscillator 370. This feedback loop acts so that the received signal and the sample hold timing pulse are in the phase relation of FIG. 14(b).

Consequently this embodiment has effects that not only the (f1+f2) signal synchronized with the received signal is outputted but also the detection of the center position of the received pulse can be performed simultaneously.

The mixing apparatus 17 with the phase plate 22 is inserted between the lenses 19 and 20, and the mixing is performed.

Since the constitution and the function of the mixing apparatus are similar to the first embodiment, the description thereof shall be omitted.

The mixing apparatus 17 of this embodiment is not limited to the application to the optical rangefinder, but it can be applied to a suitable laser light source.

First Modification

Figure 15:
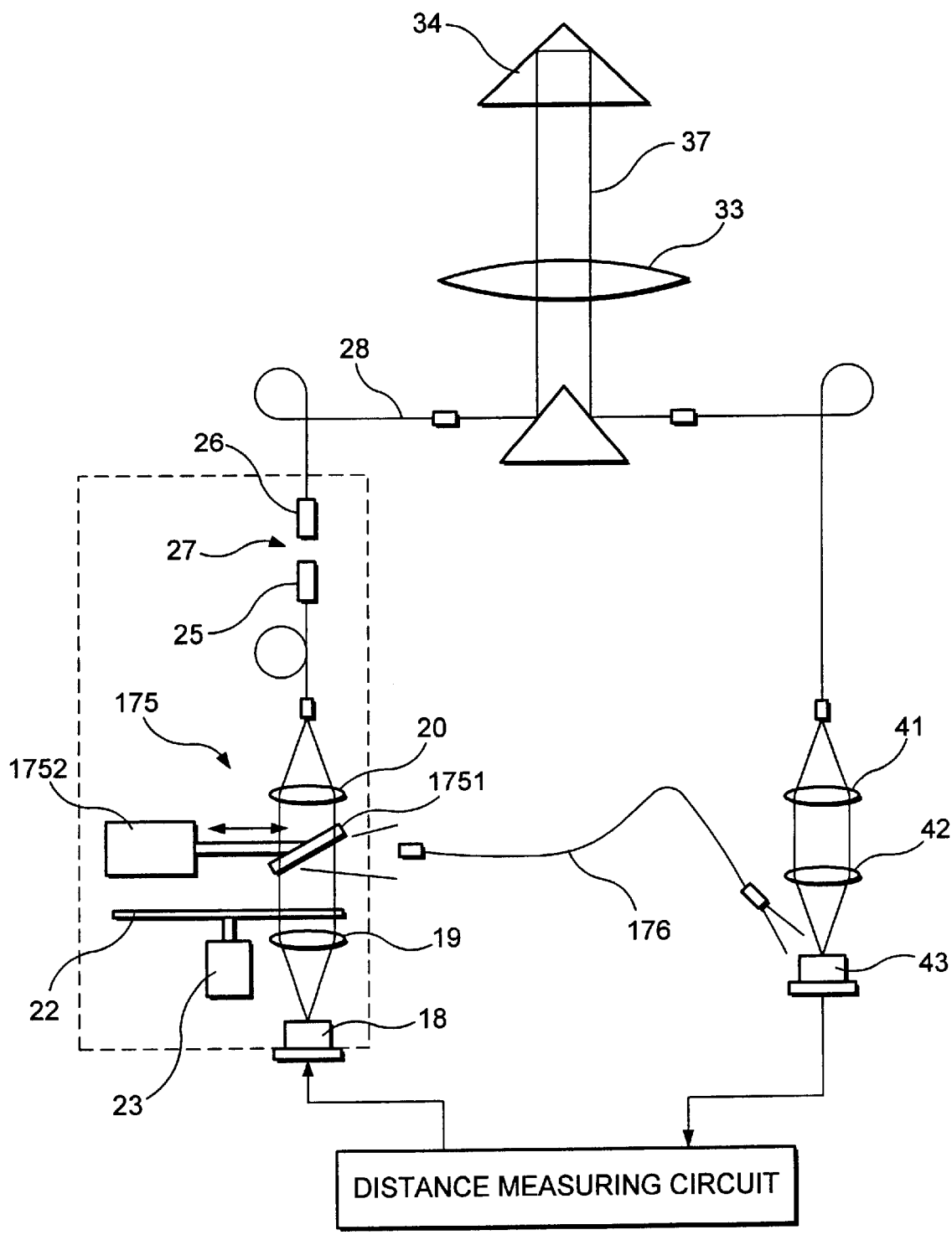
FIG. 15 is a diagram explaining a first modification.

Next, a modification of the mixing apparatus 17 of this embodiment will be described based on FIG. 15. Here, the application to the first embodiment will be described.

In order to reduce the influence to the use of the laser rays, the internal reference optical path 40 also is changed in addition to the external distance measurement optical path 37.

The distance measurement light in the first embodiment is selected to the external distance measurement optical path 37 and the internal reference optical path 40 alternately by the chopper 30. The internal reference light selected by the chopper 30 passes through the dividing prism 29, the chopper 30, the lenses 38 and 39, the density filter 31 and the dividing prism 29, and is received by the light receiving element 34. In place of this constitution, a chamber 175 and an internal reference optical fiber 176 are used.

The chamber 175 comprises a diffusion reflection mirror 1751 and a mirror control part 1752. The mirror control part 1752 allows the diffusion reflection mirror 1751 to travel into or out of the laser optical path, and the external distance measurement optical path 37 and the internal reference optical path 40 are selected alternately.

The diffusion reflection mirror 1751 is installed at the rear side of the phase plate 22, and reflects the distance measurement light toward the internal reference optical fiber 176. The distance measurement light becoming the internal reference passes through the optical fiber and the light is received directly from the light receiving element 43.

The reflection surface of the diffusion reflection mirror 1751 is constituted by a diffusion reflection sheet or the like so that the direct reflection light is not received. The diffusion reflection mirror 1751 is arranged so as not to be 45 degrees with respect to the internal reference optical fiber 176.

Since the high accuracy is not required for the used parts, the cost can be reduced.

In the present invention constituted as above described, the light source part emits light modulated by the determined modulation frequency, and the external distance measurement optical path allows the light from the light source part to pass through an article to be measured and to be led to the light receiving part. Also the internal distance measurement optical path allows the light from the light source part to be led to the light receiving part without passing through the article to be measured. The processing means calculates the distance to the article to be measured from the difference between the distance value obtained by the external distance measurement optical path and the distance value obtained by the internal distance measurement optical path. In the mixing apparatus, since the drive means drives the phase plate, and the phase plate is configured so that the rotation center thereof is at the position eccentric from the center of the diffraction grating, there is excellent effect that the high mixing effect can be obtained.

What is claimed is:

1. A mixing apparatus for mixing light from a light source, comprising:

a phase plate comprising a diffraction grating for diffracting light from said light source, wherein said diffraction grating is provided with a plurality of diffraction grating portions arranged whereby at least one of said plurality of diffraction grating portions provides a first diffraction angle different from a second diffraction angle provided by at least one other of said plurality of diffraction grating portions thereby forming a diffraction pattern, and drive means for changing the position of said phase plate, wherein said phase plate is arranged so that said diffraction pattern is varied by said drive means.

2. A mixing apparatus for mixing light from a light source according to claim 1, wherein drive means is characterized by rotating said phase plate.

3. The mixing apparatus according to claim 1, wherein said plurality of diffraction grating portions are arranged in a checkerwise pattern.

4. The mixing apparatus according to claim 1, wherein said diffraction grating is a phase modulation grating.

5. An optical rangefinder for determining distance to an article, comprising:

a light source part for emitting light modulated in determined modulation frequency;

a light receiving part, whereby said light source part and said light receiving part are provided to form an external distance measurement optical path for leading the light from said light source part to said article and then to said light receiving part, and whereby said light source part and said light receiving part are provided to form an internal reference optical path for leading light from said light source part to said light receiving part; and processing means for calculating the distance to said article from a difference between a distance value obtained by said external distance measurement path and a reference distance value obtained by said internal reference optical path, wherein said light source part is provided with a mixing apparatus for mixing light from said light source part, said mixing apparatus comprising:

a phase plate with a diffraction grating for diffracting light from said light source part, and drive means for changing the position of said phase plate, said phase plate being arranged so that said diffraction pattern is varied by said drive means.

6. An optical range finder according to claim 5, wherein drive means is characterized by rotating said phase plate.

7. An optical rangefinder for determining distance, comprising:

a light source part for emitting pulsed light;

a light receiving part, whereby said light source part and said light receiving part are provided to form an external distance measurement optical path for leading the light from said light source part to said article and then to said light receiving part, and whereby said light source part and said light receiving part are provided to form an internal reference optical path for leading the light from said light source part to said light receiving part; and processing means for calculating the distance to said article from a difference between a distance value obtained by said external distance measurement optical path and a reference distance value obtained by said internal reference optical path, wherein said light source part is provided with a mixing apparatus for mixing the light from said light source part, and wherein said mixing apparatus comprises a phase plate with a diffraction grating and drive means for varying the position of said phase plate.

8. An optical rangefinder as set forth in claim 7, wherein the phase plate is arranged so that its rotation center is at a position eccentric from the center of the diffraction grating.

9. An optical rangefinder as set forth in any one of claims 5 to 8, wherein the mixing apparatus is constituted by a chamber and an internal reference optical fiber, and the chamber is constituted by diffusion reflection mirror and a mirror drive part, and the mirror drive part moves the diffusion reflection mirror whereby the external distance measurement optical path and the internal distance measurement optical path are selected altertnately.

10. An optical rangefinder as set forth in any one of claims 5 to 9, wherein the diffraction grating is a phase modulation grating.

11. An optical rangefinder as set forth in claim 10, wherein the phase difference of the phase modulation grating has the wavelength being ½ of the wavelength of said light source.

12. An optical rangefinder as set forth in claim 10, wherein the grating shape of the phase modulation grating is checkerwise pattern.

13. The mixing apparatus according to claim 4, wherein said plurality of diffraction grating portions of said phase modulation grating are arranged in a checkerwise pattern.

14. The optical rangefinder according to claim 5, wherein said diffraction grating comprises a plurality of diffraction grating portions arranged whereby at least one of said plurality of diffraction grating portions provides a first diffraction angle different from a second diffraction angle provided by at least one other of said plurality of diffraction grating portions thereby forming a diffraction pattern.

15. The optical rangefinder according to claim 7, wherein said diffraction grating comprises a plurality of diffraction grating portions arranged whereby at least one of said plurality of diffraction grating portions provides a first diffraction angle different from a second diffraction angle provided by at least one other of said plurality of diffraction grating portions thereby forming a diffraction pattern.

* * * * *